July 8, 1930.  V. MILSTEIN  1,770,084
CANOPY FOR CARS
Filed Dec. 30, 1927   2 Sheets-Sheet 1

INVENTOR.
Victor Milstein
BY Percy Freeman
ATTORNEY

July 8, 1930. V. MILSTEIN 1,770,084
CANOPY FOR CARS
Filed Dec. 30, 1927   2 Sheets-Sheet 2
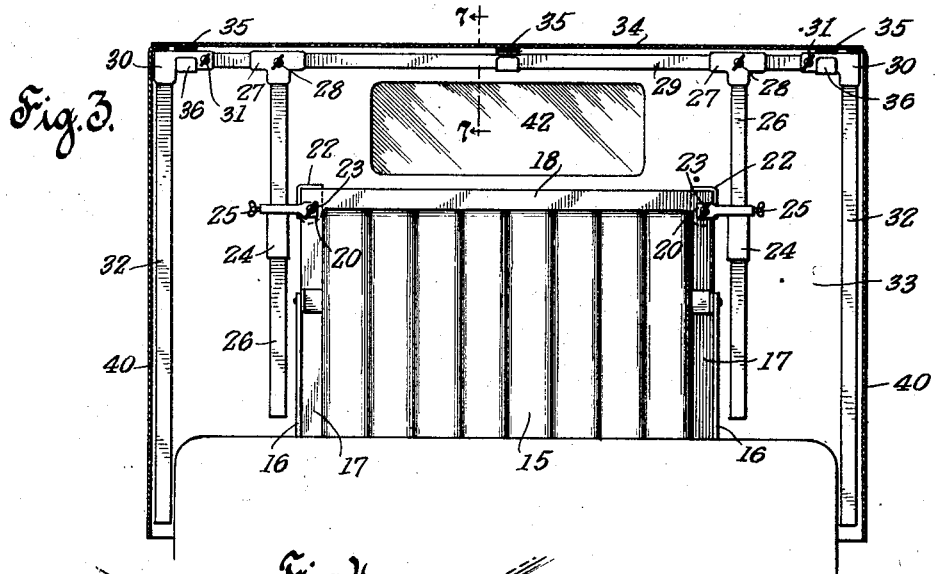
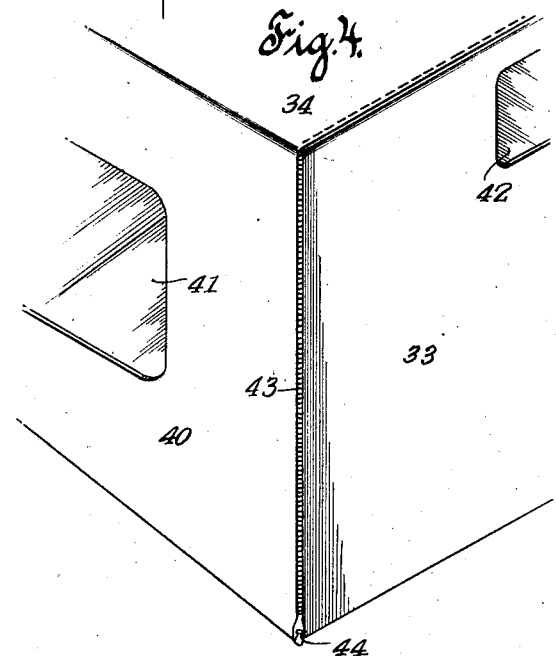
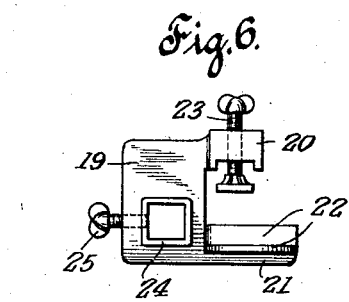
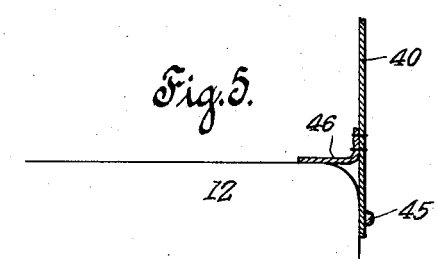
INVENTOR.
Victor Milstein
BY
Sereij Freeman
ATTORNEY Patented July 8, 1930

1,770,084

UNITED STATES PATENT OFFICE

VICTOR MILSTEIN, OF NEW YORK, N. Y., ASSIGNOR TO LENA MILSTEIN, OF NEW YORK, N. Y.

CANOPY FOR CARS

Application filed December 30, 1927. Serial No. 243,560.

This invention relates to automobiles of the covered coupe or single seat type for two passengers and which includes a rumble seat at the rear to be used as necessity may occur.

The word necessity is used advisedly as the occupant of such rumble seat is ordinarily exposed to dust, and particularly to the inclemencies of the weather, whether to the glaring rays of the sun, or storm and cold, against which no protection is provided.

It is therefore the main object of this invention to provide a device readily attached to the body of the vehicle whereby the occupant of a rumble seat may be rendered as comfortable and as well protected as are the riders in the main front seat.

A further feature is in the provision of an attachment, including a tight walled enclosure, that may be easily and rapidly installed, or quickly removed and compactly folded to be carried by the vehicle when its use is not needed.

Other purposes are to produce an efficient casing capable of metamorphosing a single seat vehicle into one of double seat capacity, entirely without change in the structure and which presents a harmonious appearance, in nowise incongruous with the normal aspect of the vehicle.

These and other like objects are attained by the novel and practical construction and arrangement of parts hereinafter described and shown in the accompanying drawings, forming a material part of this disclosure, and in which:—

Fig. 3 is an enlarged transverse sectional view taken on line 3—3 of Fig. 2.

Fig. 4 is a perspective view showing a rear corner of the hood, and its connections.

Fig. 5 is a fragmentary sectional view taken on line 5—5 of Fig. 2.

Fig. 6 is a plan view of one of the adjustable support brackets.

Fig. 7 is a transverse sectional view taken along line 7—7 of Fig. 3.

Figure 1:
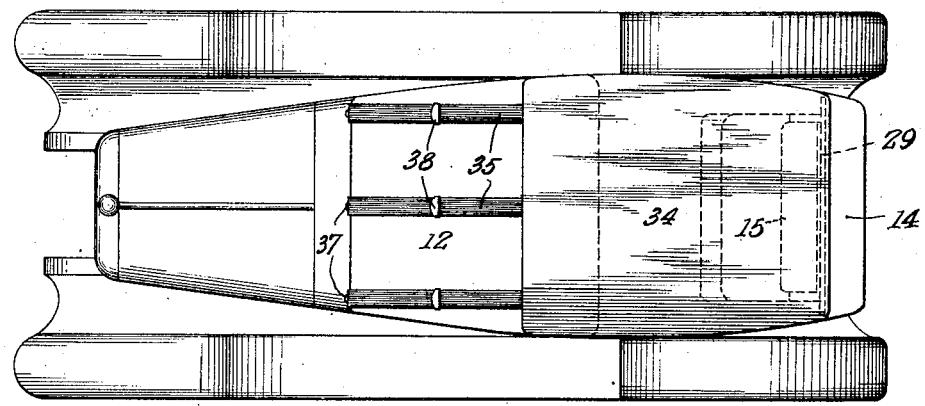
Fig. 1, is a top plan view of a conventional type of coupe showing the application of an embodiment of the invention.
Figure 2:
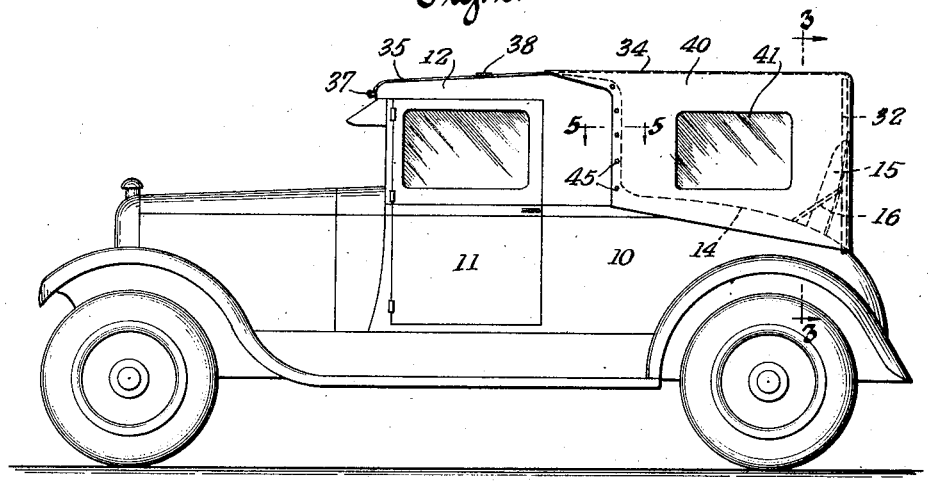
Fig. 2 is a side elevational view of the same.

In Figs. 1 and 2 are shown an ordinary type of automobile, known as a coupe, the same being provided with the usual running gear on which is mounted a body 10 having side doors 11 and top 12 over the seat, the back of which extends from the top to blend into the curved rear 14 of the body.

An opening in this curved body portion is normally covered by a seat back 15 foldable thereover in a manner well known and common to this type of vehicle.

When extended for use this back is held in operative position by a pair of braces 16 pivoted to its side frame 17 and foldable into the opening at the sides of the rumble seat.

The side elements 17 are joined at their upper ends by a bar 18 to provide a firm structure.

In carrying out the invention there are provided a pair of opposed support brackets 19 consisting of plate members having inreaching jaws 20 and 21, the latter being provided with right angled elements 22 which together engage the frame corners at the joints of the elements 17 and 18, and are clamped securely thereon by clamp screws 23 carried by the jaws 20.

Extending downwardly from the plate elements of the brackets 19, beyond and parallel with the frame sides 17, are rectangular tubes 24 provided with clamp screws 25 and adapted to adjustably receive bars 26 slidable vertically therein.

The bars 26 are fixed at their upper ends in sockets formed midway between the ends of slides 27 provided with thumb screws 28 and adapted to adjustably receive a hollow rectangular transverse rail 29 extending coincidently with the full width of the vehicle at a height approximately level with its top 12.

Adjustable on the ends of the rail 29 are right angled corner connections 30, held by clamp screws 31 to the bar and fixed in these connections are substantially vertical frame bars 32 reaching downward alongside the rear of the body 10, the foregoing elements constituting a demountable frame at the rear of the vehicle.

Extending interiorly of this frame is a covering 33 of material similar to the upper side portions and top of the vehicle, the same passing over the rail to reach into intimate contact with the surface 14 of the vehicle body, and its forward portion 34 is extended towards the front to engage the top 12.

This cover portion 34 is supported by a series of straps 35 engaged at their rear ends by clips 36 carried by the rail 29 and extending over the top 12 to connect with clips 37 on the extreme forward edge of the top 12, the straps being held in adjustment by slides 38 disposed midway in the length of the top.

Side curtains 40 are secured below the cover 34, their lower angularly cut edges extending below the upper edges of the vehicle sides 10.

Windows 41, of any suitable material, may be set in the curtains 40 and a rear window 42 provided in the wall 33 above the seat back 15.

The edges of the curtains 40 and rear covering 33 are provided with runner fastenings 43 controlled by the runner 44, so that a tight joint is provided but readily opened for access in a well known manner.

The forward edges of the curtains are preferably connected to the raised side portions of the vehicle by snap fasteners 45 and to provide a tight joint at their forward edges, pairs of flexible flaps 46 are fixed to the inner sides of the curtain to contact with the rear surface of the raised portion of the vehicle body and it is to be noted that the cover 34 is preferably extended considerably in advance of the side edges of the curtains.

From the foregoing it will be seen that the frame and coverings may be easily and quickly placed in operative position or dismounted, and that when in an operative position, the rumble or rear seat is amply protected against the entrance of dust and the inclemencies of the weather.

It will be further seen that a rumble seat canopy frame has been provided, which is adapted to be adjusted for attachment to any make of car of the type described, regardless of the varying sizes of said cars, such as width and height of the rumble seat back rest, width of the body of the car and height of the permanent roof of the car.

Although the foregoing is generally descriptive of the best known embodiment of the invention, it will be apparent that changes of minor nature may be made without departing from the tenor and scope of the appended claims.

Having thus described my invention and set forth the manner of its construction and use, what I claim as new and desire to secure by Letters Patent is:—

1. The combination with a vehicle having a rumble seat, a back-rest therefor and a canopy thereover, of a universally adjustable demountable frame for supporting the said canopy, said frame comprising clamp members for attachment to the ends of said back rest, vertically adjustable bars slidable in said members, a transverse horizontal rail adjustably supported by said bars and frame bars adjustably depending from the ends of said rail, spaced from and parallel to said first mentioned bars.

2. As an article of manufacture, a universally adjustable demountable frame for supporting a canopy over vehicle rumble seats, said frame comprising a horizontal rail, brackets slidable adjustably along said rail, vertical bars suspended from said brackets, clamp members for attachment to the back-rest of the rumble seat, said members having tubular elements slidably receptive of said vertical bars, means on said clamp members for holding said bars in vertical adjustment with respect to the rumble seat, and frame members adjustably depending from the ends of said rail.

Signed in the city of New York, county and State of New York, this 28th day of December, 1927.

VICTOR MILSTEIN.